United States Patent
Zeller et al.

(10) Patent No.: US 6,274,660 B1
(45) Date of Patent: Aug. 14, 2001

(54) COATING COMPOSITION AND ITS USE AND PROCESS FOR ITS PREPARATION

(75) Inventors: Edgar Zeller, Mannheim; Peter Schwab, Bad Dürkleim; Peter-Heinz Rink; Hubert Baumgart, both of Münster; Edeltraud Hagemeister, Greven; Thomas Farwick, Billerbeck, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/243,948

(22) Filed: Feb. 3, 1999

(51) Int. Cl.$^7$ ........................................................ B05D 3/02
(52) U.S. Cl. ........................... 524/379; 524/111; 524/380; 524/381; 524/386; 524/388; 524/389; 524/391; 524/502; 524/513; 524/514; 427/385.5; 427/388.1; 427/389.7; 427/391; 427/393.5; 427/395
(58) Field of Search ........................................... 524/111, 379, 524/380, 381, 386, 388, 389, 391, 502, 513, 514; 427/385.5, 388.1, 389.7, 391, 393.5, 395

(56) References Cited

U.S. PATENT DOCUMENTS 4,229,562 * 10/1980 Rogier ........................................ 528/85
4,642,391 * 2/1987 Rogier ........................................ 568/624

FOREIGN PATENT DOCUMENTS

WO 9717431  5/1997 (WO) .............................. C12N/5/10

OTHER PUBLICATIONS

R. H. Grubbs in Comprehensive Organomet. Chem., Pergamon Press, Ltd., New York, vol. 8, p. 499 ff. 1982.
Angew. Chem. 107, p. 2179 ff (1995), in J. Am. Chem. Soc. 118, p. 100 ff (1996) and in J Chem. Soc., Chem. Commun. p. 1127 ff. (1995).

* cited by examiner

Primary Examiner—Ana Woodward

(57) ABSTRACT

The present invention relates to a coating composition featuring increased solids contents, which comprises at least one polyol I obtainable by subjecting at least one oligomer of the general formula I

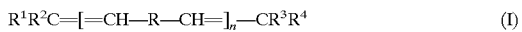

in which R=$—(—CH_2—)_m—$, in which the index m is an integer from 2 to 6, or

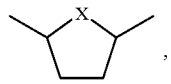

in which X=$—CH_2—$ or an oxygen atom $R^1, R^2, R^3$ and $R^4$ independently of one another=hydrogen atoms or alkyl; and the index n=an integer from 1 to 15;

to hydroformylation and reducing the resultant aldehyde-functional products I to give the polyols I, which, if desired, are subjected to partial or complete hydrogenation.

18 Claims, No Drawings

COATING COMPOSITION AND ITS USE AND PROCESS FOR ITS PREPARATION

FIELD OF THE INVENTION

The present invention relates to a coating composition, to a process for preparing it and to its use.

BACKGROUND OF THE INVENTION

The coating materials that are known nowadays, examples being clearcoats, topcoats and surfacers, are based on binders which are required to have a large number of different functionalities in order that required coating properties can be achieved. Such coating systems are known, for example, from the German Patents DE 44 07 415, DE 44 07 409 or DE 43 10 414. The disadvantage of all these coating materials is that the solids contents cannot be increased ad infinitum. With these systems, therefore, reducing the solvent emission is a possibility only within narrow confines.

SUMMARY OF THE INVENTION

The present invention, therefore, is based on the object of providing a coating composition which relative to the coating compositions known to date has an increased solids content in conjunction with good scratch resistance and high reflow.

DETAILED DESCRIPTION OF THE INVENTION

This object is achieved in accordance with the invention in that said composition comprises polyols I which are obtained by subjecting oligomers of the formula I $$R^1R^2C = [=CH-R-CH=]_n = CR^3R^4 \quad (I)$$

in which R=—(—CH$_2$—)$_m$—, in which the index m is an integer from 1 to 6, or

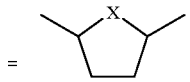

in which X=—CH$_2$— or an oxygen atom
$R^1, R^2, R^3$ and
$R^4$ independently of one another=hydrogen atoms or alkyl; and
the index n=an integer from 1 to 15;
to hydroformylation and reducing the resultant aldehyde-functional products I to give the polyols I, which, if desired, are subjected to partial or complete hydrogenation.

The value n in the formula I stands for the number of divalent radicals R which have been introduced by ring-opening metathesis reaction into the oligomers I derived from cyclic olefins such as, for example, cyclopropene, cyclopentene, cyclobutene, cyclohexene, cycloheptene, norbornene, 7-oxanorbornene or cyclooctene. Preferably, as large as possible a proportion—such as, for example, at least 40% by weight (as determined by integrating the areas of the gas chromatograms; instrument: Hewlett Packard; detector: flame ionization detector; column: DB 5.30 m×0.32 mm, covering: 1μ; temperature program: 60° C. for 5 minutes, isothermal, heating rate 10° C./min, max: 300° C.)—of the oligomer mixtures I which can be employed in accordance with the invention has a value of n>1. The value n and thus the degree of ring-opening metathesis can, as set out further below, be influenced by the activity of the metathesis catalyst used.

The radicals $R^1, R^2R^3$ and $R^4$ stand independently of one another for hydrogen or alkyl, where the term "alkyl" embraces straight-chain and branched alkyl groups.

Preferably, the groups concerned are straight-chain or branched $C_1-C_{15}$-alkyl, preferably $C_1-C_{10}$-alkyl, and with particular preference, $C_1-C_5$-alkyl groups. Examples of alkyl groups are, in particular, methyl, ethyl, propyl, 1-methylethyl, butyl, 1-methylpropyl, 2-methylpropyl, 1,1-dimethylethyl, n-pentyl, 1-methylbutyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 3-methylpentyl, 4-methylpentyl, 1,2-dimethylbutyl, 1,3-dimethylbutyl, 2,3-dimethylbutyl, 1,1-dimethylpropyl, 1,2,2-trimethylpropyl, 1-ethylbutyl, 2-ethylbutyl, 1-ethyl-2-methylpropyl, n-heptyl, 1-methylhexyl, 1-ethylpentyl, 2-ethylpentyl, 1-propylbutyl, octyl, decyl, dodecyl, etc.

The degree of branching and the number of carbon atoms of the terminal alkyl radicals $R^1, R^2, R^3$ and $R^4$ depend on the structure of the acyclic monoolefins of the hydrocarbon mixture used and on the activity of the catalyst. As described with more precision below, the activity of the catalyst influences the degree of cross-metathesis (self-metathesis) of the acyclic olefins, with the formation of structurally new olefins into which, formally, cyclopentene is then inserted in the manner of a ring-opening metathesis addition polymerization.

Preference is given to the use of oligomer mixtures featuring an increased proportion of oligomers having only one terminal double bond. The oligomer is preferably prepared by subjecting a hydrocarbon mixture obtained by cracking from petroleum processing ($C_5$ cut) and comprising a cyclic monoolefin such as cyclopropene, cyclobutene, cyclopentene, cyclohexene, cycloheptene, cyclooctene, norbornene or 7-oxanorbornene, plus acyclic monoolefins, to a homogeneous or heterogeneous metathesis reaction.

The metathesis reaction formally comprises
a) the disproportionation of the acyclic monoolefins of the hydrocarbon mixture by cross-metathesis,
b) the oligomerization of the cyclic monoolefin by ring-opening metathesis,
c) chain termination by reaction of the oligomers from b) with an acyclic olefin of the hydrocarbon mixture or of a product from a),
it being possible for steps a) and/or b) and/or c) to be gone through repeatedly, either alone or in combination.

Step a)

The cross-metathesis of the acyclic monoolefins will be illustrated using the metathesis of 1-pentene and 2-pentene as an example:

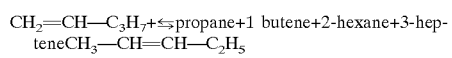

The combination of cross-metathesis of different acyclic olefins and self-metathesis of the same acyclic olefins, such as, for example, the self-metathesis of 1-pentene to ethene and 4-octene, and repetition of this reaction, produce a large number of monoolefins with different structures and numbers of carbon atoms, these monoolefins forming the end groups of the oligomers I. The proportion of cross-metathesis products, which increases as the activity of the catalyst used goes up, also influences the double bond content of the oligomers. For example, in the self-metathesis of 1-pentene described above, ethene is released which, if desired, can escape in gas form, with one double bond equivalent being removed from the reaction. At the same time, there is an increase in the proportion of oligomers without terminal double bonds. Thus in the above example an oligomer without terminal double bonds is formed, for example, by insertion of the cyclic monoolefin into 4-octene. Step b) The average number of insertions of the cyclic monoolefin in the growing chain in the sense of a ring-opening metathesis addition polymerization determines the average molecular weight of the oligomer mixture I that is formed. Preferably, oligomer mixtures I having an average molecular weight of at least 274 g per mol are formed by the process of the invention, which corresponds to an average number of three units of a cyclic monoolefin per oligomer. Step c)

Chain termination takes place by reaction of oligomers that still have an active chain end in the form of a catalyst complex (alkylidene complex) with an acyclic olefin; in the course of this reaction, ideally, an active catalyst complex is recovered. In that case, the acyclic olefin may originate unchanged from the hydrocarbon mixture originally employed for the reaction, or may have been modified in a cross-metathesis in accordance with stage a).

Very generally, the process is suitable for preparing oligomers I from hydrocarbon mixtures which comprise acyclic and cyclic monoolefins: monoolefins such as, for example, cyclobutene, cyclopentene, cyclohexene, cycloheptene, norbornene or 7-oxanorbornene, especially cyclopentene. Variants of this process are described, for example, in the article by M. Schuster and S. Bleckert in Angewandte Chemie, 1997, Volume 109, pages 2124 to 2144.

Preference is given to the use of a hydrocarbon mixture obtained industrially in the processing of petroleum, it being possible if desired to subject said mixture to catalytic partial hydrogenation beforehand in order to remove dienes. A particularly suitable mixture for use in the present process is, for example, a mixture enriched in saturated and unsaturated $C_5$-hydrocarbons ($C_5$ cut). In order to obtain the $C_5$ cut it is possible, for example, first to subject pyrolysis benzine obtained in the steam cracking of naphtha to a selective hydrogenation in order to convert, selectively, the dienes and acetylenes present into the corresponding alkanes and alkenes, and subsequently to subject the product to a fractional distillation, producing firstly the $C_6$–$C_8$ cut, which is important for further chemical syntheses and comprises the aromatic hydrocarbons, and secondly the $C_5$ cut, which is used for the process of the invention.

The $C_5$ cut generally has an overall olefin content of at least 30% by weight, preferably at least 40% by weight and, in particular, at least 50% by weight.

Suitable in this context are $C_5$ hydrocarbon mixtures having an overall cyclopentene content of at least 5% by weight, preferably at least 10% by weight and, in particular, at least 12% by weight, and generally not more than 30% by weight, preferably not more than 20% by weight.

Furthermore, suitable $C_5$ hydrocarbon mixtures have a proportion of pentene isomers among the acyclic monoolefins of at least 70% by weight, preferably at least 80% by weight and, in particular, at least 90% by weight.

The preparation process can also be performed with a $C_5$ cut which is obtained industrially and has an overall olefin content of, for example, from 50 to 60% by weight, such as about 56%, a cyclopentene content of, for example, from 10 to 20% by weight, such as about 15% by weight, and a content of pentene isomers of, for example, 33 to 43% by weight, such as about 38% by weight, with about 16% by weight being accounted for by the n-pentene and about 22% by weight by isomeric pentenes.

In one specific embodiment, the hydrocarbon mixture used in the preparation process comprises the $C_5$ cut and a petroleum fraction (raffinate 2) which comprises acyclic $C_4$ olefins.

In another specific embodiment of the preparation process a hydrocarbon mixture is used which comprises the $C_5$ cut and ethene. In this case, oligomer mixtures I having an increased double bond content are obtained. This is achieved first by ethenolysis of the acyclic n- and iso-pentenes present in the $C_5$ cut to give shorter-chain α-olefins, such as propene and 1-butene, which react with cyclopentene in a ring-opening metathesis reaction to form oligomers I having in each case one terminal double bond. In addition, in the presence of ethene, the self-metathesis of the acyclic olefins to form further ethene, such, for example, as the self-metathesis of 1-pentene to form ethene and 4-octene, which as a chain terminating reagent leads to products without terminal double bonds, is suppressed. Second, a further increase in the double bond content is achieved through the ethenolysis of cyclopentene with ethene to give 1,6-heptadiene. This results in sequences of oligomers each of which have two terminal double bonds. When oligomer mixtures I obtained in this way, having an increased double bond content, are used for the functionalization, the result is preferably oligomer mixtures I having an increased density of functionalities.

Suitable catalysts for the metathesis are known from the prior art and include homogeneous and heterogeneous catalyst systems. In general, the catalysts suitable for the preparation process are based on a transition metal from subgroup 6, 7 or 8 of the Periodic Table, with preference being given to the use of catalysts based on Mo, W, Re and Ru.

Suitable homogeneous catalyst systems are generally transition metal compounds which, alone or in combination with a cocatalyst and/or in the presence or absence of the olefin precursors, are capable of forming a catalytically active metal carbene complex. Such systems are described, for example, by R. H. Grubbs in Comprehensive Organomet. Chem., Pergamon Press, Ltd., New York, Vol. 8, p. 499 ff. (1982).

Suitable catalyst/cocatalyst systems based on W, Mo and Re may comprise, for example, at least one soluble transition metal compound and an alkylating agent. Examples include $MOCl_2(NO)_2(PR_3)_2/Al_2(CH_3)_3Cl_3$; $WCl_6/BuLi$; $WCl_6/EtAlCl_2(Sn(CH_3)_4/EtOH$; $WOCl_4/Sn(CH_3)_4$; $WOCl_2$ $(O-[2,6-Br_2—C_6H_3])/Sn(CH_3)_4$; $CH_3ReO_3/C_2H_5AlCl_2$, the four latter systems being preferred for the process of the invention.

Further transition metal/alkylidene complexes suitable as metathesis catalysts are described by R. R. Schrock in Acc. Chem. Res., 23, p. 158 ff (1990). In general terms these are tetracoordinated Mo- and W-alkylidene complexes, which in addition have two bulky alkoxy ligands and one imido ligand. Of these, preference is given for the process of the invention to the use of $((CH_3)_3CO)_2Mo(=N-[2,6-(i-C_3H_7)_2-C_6H_3])(=CHC(CH_3)_2C_6H_5)$ and $[(CF_3)_2C(CH_3)O]_2Mo(=N-[2,5-(i-C_3H_7)—C_6H_3])(=CH(CH_3)_2C_6H_5)$.

In particular, the catalysts used as homogeneous metathesis catalysts are those which are described in Angew. Chem. 107, p. 2179 ff. (1995), in J. Am. Chem. Soc. 118, p. 100 ff. (1996) and in J. Chem. Soc., Chem. Commun, p. 1127 ff. (1995). These include, in particular, $RuCl_2(=CHR)(PR'_3)_2$, preferably $RUCl_2(=CHC_6H_5)(P(C_6H_{11})_3)_2$, $(\eta^6$-p-cymene)

RuCl$_2$(p(C$_6$H$_{11}$)$_3$) and 3 mole equivalents of diazoalkane ((CH$_3$)$_3$SiCHN$_2$ or C$_6$H$_5$CHN$_2$) generated in situ.

Suitable heterogeneous catalyst systems comprise, in general, a transition metal compound on an inert support, said system being capable without a cocatalyst of forming a catalytically active alkylidene complex by reaction with the olefin precursors. It is preferred to use Re$_2$O$_7$ and CH$_3$ReO$_3$.

Suitable inorganic supports are the oxides customary for this purpose, especially silicon oxides and aluminum oxides, aluminosilicates, zeolites, carbides, nitrides, etc., and mixtures of them. Preferred for use as supports are Al$_2$O$_3$, SiO$_2$ and mixtures of them, alone or in combination with B$_2$O$_3$ and Fe$_2$O$_3$.

The abovementioned homogeneous and heterogeneous catalyst systems differ greatly in their catalytic activity, so that the individual catalysts have different optimum reaction conditions for the metathesis. As already described above, the catalytic activity with respect to the cross-metathesis (step a)) also influences the product distribution of the oligomer mixtures I derived from cyclopentene. For instance, the ruthenium-based homogeneous catalyst systems RuCl$_2$(=CHC$_6$H$_5$)(P(C$_6$H$_{11}$)$_3$)$_3$, ($\eta^6$-p-cymene)-RuCl$_2$(P(C$_6$H$_{11}$)$_3$)/(CH$_3$)$_3$SICHN$_2$ and ($\eta^6$-p-cymene)-RuCl$_2$(P(C$_6$H$_{11}$)$_3$)/C$_6$H$_5$CHN$_2$ are particularly suitable for the preparation process. Of these compounds, the first ruthenium complex has a higher catalytic activity than the last two, and so under otherwise identical reaction conditions leads to higher space-time yields. At the same time, however, in the case of the first complex there is also an increased level of cross-metathesis, which is also accompanied in part by the release of ethene; therefore, the resultant cyclopentene-derivative oligomer mixture I has a somewhat smaller proportion of double bonds, which is manifested, for example, in a lower iodine number. Moreover, because of the cross-metathesis, a larger number of acylic olefins without terminal double bonds is available, so that the first homogeneous ruthenium catalyst produces a higher proportion of cyclopentene-derived oligomers I having only one terminal double bond or none. The two latter ruthenium complexes have a somewhat lower catalytic activity than the first, so that when they are used the cyclopentene-derived oligomer mixtures I obtained in accordance with the process of the invention have a higher double bond content and thus a higher iodine number and also a larger proportion of terminal double bonds.

The heterogeneous catalyst systems also have the above-described differences in activity, with the corresponding influence on the metathesis products. If CH$_3$ReO$_3$ on Al$_2$O$_3$ is used as a heterogeneous catalyst for the preparation process, it has a higher catalytic activity than the corresponding homogeneous catalyst system comprising CH$_3$ReO$_3$/(C$_2$H$_5$)AlCl$_2$.

As a homogeneous catalyst it is advantageous to use Re$_2$O$_7$ on Al$_2$O$_3$. This has an activity comparable approximately with that of RuCl$_2$(=CHC$_6$H$_5$)(P(C$_6$H$_{11}$)$_3$)$_2$ and a similar product distribution and, following regeneration in a stream of air at elevated temperatures, such as about 550° C., can be used again.

If desired, therefore, it is possible depending on the catalyst used to obtain cyclopentene-derived oligomer mixtures I having varying double bond contents and varying proportions of terminal double bonds.

In one specific embodiment of the preparation process the metathesis catalyst used is a homogeneous ruthenium-based catalyst selected from RuCl$_2$(=CHC$_6$H$_5$)(P(C$_6$H$_{11}$)$_3$)$_2$, ($\eta^6$-p-cymene)RuCl$_2$(P(C$_6$H$_{11}$)$_3$)/(CH$_3$)$_3$SiCHN$_2$ and ($\eta^6$-p-cymene)RuCl$_2$(P(C$_6$H$_{11}$)$_3$)/C$_6$H$_5$CHN$_2$ which is added to the reaction mixture as a solution in an organic solvent. Examples of suitable solvents are aromatic hydrocarbons, such as toluene and xylene, and halogenated alkanes, such as CH$_2$Cl$_2$, CHCl$_3$ etc.

The reaction temperature with reactive catalyst systems is from −20 to 200° C., preferably from 0 to 100° C. and, in particular, from 20 to 80° C.

The reaction can be conducted at a superatmospheric pressure of up to 5 bar, preferably up to 2 bar, or, with particular preference, can be carried out at ambient pressure.

In a further specific embodiment of the preparation process the metathesis catalyst used is a heterogeneous rhenium-based catalyst selected from CH$_3$ReO$_3$/Al$_2$O$_3$ and, preferably, Re$_2$O$_7$/Al$_2$O$_3$, which is added to the reaction mixture without the addition of solvent.

In the case of these catalysts, which are somewhat less active than the abovementioned homogeneous catalyst systems, the reaction temperature is from about 20 to 120° C., in particular from 40 to 80° C.

The reaction is preferably conducted at a superatmospheric pressure of from 2 to 20 bar, preferably from 3 to 15 bar and, in particular, from 4 to 12 bar.

In terms of process regime, the preparation process can be performed either continuously or batchwise. Suitable reaction apparatuses are known to the person skilled in the art and are described, for example, in Ullmanns Enzyklopädie der technischen Chemie, Vol. 1, p. 743 ff. (1951). It includes for the batchwise process, for example, stirred vessels and for the continuous process, for example, tube reactors.

In one suitable batchwise variant of the preparation process it is possible to react, for example, the C$_5$ cut over one of the homogeneous ruthenium catalysts described above as being preferred, which is produced if desired in situ within the reactor vessel, in a metathesis reaction to give the cyclopentene-derived oligomer mixtures I.

In a further suitable, continuous variant of the preparation process it is possible to react, for example, the C$_5$ cut over one of the heterogeneous rhenium catalysts described above as being preferred, in a tube reactor.

Both possible process variants give space-time yields, depending on the catalyst used and on the other reaction parameters, especially the reaction temperature, of at least 10 g l$^{-1}$ h$^{-1}$, preferably at least 15 g l$^{-1}$ h$^{-1}$. Depending on the activity of the catalyst, however, it is also possible to obtain substantially higher space-time yields of up to about 500 g l$^{-1}$ h$^{-1}$.

The reaction mixture is separated by customary methods. These include, for example, fractional distillation, at atmospheric or reduced pressure, or separation at elevated temperatures and atmospheric pressure in a falling-film evaporator. Low-boiling fractions comprising still unreacted olefins can if desired be recycled to the reaction apparatus. Advantageously, extensive reaction of the olefins present in the C$_5$ cut to oligomers I is achieved in the course of the preparation process, so that the low boilers which are separated off comprise a C$_5$ hydrocarbon mixture with predominantly saturated cyclic and acyclic compounds.

As described above, the number and position of the double bonds in the oligomers I can be influenced by the reaction conditions, especially the particular catalyst used. The process described produces cyclopentene oligomers I for which the iodine number is at least 250 g of I$_2$/100 g oligomers I, preferably at least 300 g of I$_2$/100 g of oligomers I.

The average molecular weight of these oligomers I derived from cyclic monoolefins, especially cyclopentene, is at least 274 g/mol, which corresponds to an average conversion of three cyclopentene units per oligomer, with chain termination by an acyclic pentene (and not by a cross-metathesis product) being assumed in this case.

In order to prepare the polyols I for use in accordance with the invention, the oligomers I detailed above are subjected to customary and conventional hydroformylation. Here, in general, the oligomers I are reacted with hydrogen and carbon monoxide in the presence of catalysts comprising suitable transition metals under atmospheric pressure or under superatmospheric pressure at temperatures from 50 to 150° C. to give aldehyde-functional products I.

An example of a suitable transition metal is rhodium.

The resultant products I are isolated and are reduced in a customary and conventional manner to give the polyols I to be used in accordance with the invention. Reducing agents suitable for this purpose are all those with which aldehyde groups can be reduced to hydroxyl groups. Examples of suitable reducing agents are borohydrides, such as sodium tetrahydroboronate, or hydrogen in the presence of hydrogenation catalysts.

Examples of suitable hydroformylation and reduction processes are described in European Patent 0 502 839.

The polyols I to be used in accordance with the invention can be subjected in a customary and conventional manner to partial or complete hydrogenation. Suitable reducing agents for this purpose include those mentioned above.

The polyols I to be used in accordance with the invention have a hydroxyl number (OHN) of from 200 to 650, in particular 250 to 450. Their number-average molecular weight $M_n$, determined with the aid of gel permeation chromatography using polystyrene as the internal standard, lies within the range from 400 to 1000, in particular from 400 to 600. Their mass-average molecular weight $M_w$, determined with the aid of gel permeation chromatography and polystyrene as the internal standard, lies within the range from 600 to 2000, in particular from 600 to 1100. The polydispersity $M_n/M_w$ is from 1.4 to 3, in particular from 1.7 to 1.9.

An example of a particularly advantageous polyol to be used in accordance with the invention has an OHN of 350, an $M_n$ of 561 and an $M_w$ of 1,068.

The polyols I to be used in accordance with the invention are present in the coating compositions of the invention in an amount of from 5 to 50% by weight, based on the solids content of the coating composition. Particularly advantageous coating compositions of the invention are obtained by substituting up to 40%, preferably up to 30%, with particular preference up to 20% and, in particular, up to 10% by weight of the solids of a coating composition by at least one polyol I to be used in accordance with the invention.

Suitable candidates for the hydroxy-functional binder or for the mixture of hydroxy-functional binders are preferably binders based on polyacrylates, polyesters, polyurethanes, acrylicized polyurethanes, acrylicized polyesters, polylactones, polycarbonates, polyethers and/or (meth)acrylatediols. Hydroxy-functional binders are known to the person skilled in the art, and many suitable examples are available on the market.

Preference is given to the use of polyacrylates, polyesters and/or polyurethanes, especially polyacrylates and/or polyesters.

Polyacrylate resins have OHNs of from 40 to 240, preferably from 60 to 210 and, with very particular preference, from 100 to 200, acid numbers of from 0 to 35, preferably from 0 to 23 and, with very particular preference, from 3.9 to 15.5, glass transition temperatures of from −35 to +70° C., preferably from −20 to +40° C. and, with very particular preference, from −10 to +15° C., and number-average molecular weights of from 1500 to 30,000, preferably from 1500 to 15,000 and, with very particular preference, from 1500 to 5000.

The glass transition temperature of the polyacrylate resins is determined by the nature and amount of the monomers employed. The monomers can be selected by the person skilled in the art with the aid of the following formula, which can be used to calculate approximately the glass transition temperatures of polyacrylate resins:

$$n=x \ 1/Tg = \Sigma \ Wn/Tg_n; \ \Sigma_n W_n = 1 \ n=1$$

Tg=glass transition temperature of the polyacrylate resin
$W_n$=proportion by weight of the nth monomer
$Tg_n$=glass transition temperature of the homopolymer of the nth monomer
x=number of different monomers Measures to control the molecular weight (for example, the selection of appropriate polymerization initiators, use of chain transfer agents, etc.) are part of the knowledge of the person skilled in the art and need not be elucidated further here.

As the hydroxy-functional binder component it is also possible, for example, to employ polyacrylate resins which can be prepared by subjecting (a2) from 10 to 92, preferably from 20 to 60% by weight of an alkyl or cycloalkyl acrylate or of an alkyl or cycloalkyl methacrylate having 1 to 18, preferably 4 to 13 carbon atoms in the alkyl or cycloalkyl radical, or mixtures of such monomers, (b2) from 8 to 60, preferably from 12.5 to 38.5% by weight of a hydroxyalkyl acrylate or of a hydroxyalkyl methacrylate having 2 to 4 carbon atoms in the hydroxyalkyl radical, or mixtures of such monomers, (c2) from 0.0 to 5.0, preferably from 0.7 to 3.0% by weight of acrylic acid or methacrylic acid, or mixtures of these monomers, and (d2) from 0 to 50, preferably from 0 to 30% by weight of ethylenically unsaturated monomers which are different from but copolymerizable with (a2), (b2) and (c2), or mixtures of such monomers, to addition polymerization to give polyacrylate resins having hydroxyl numbers of from 40 to 240, preferably from 60 to 150, acid numbers of from 0 to 35, preferably from 5 to 20, glass transition temperatures of from −35 to +70 degrees C., preferably from −20 to +40 degrees C., and number-average molecular weights of from 1500 to 30,000, preferably from 1500 to 15,000 (determined by gel permeation chromatography, with polystyrene as standard). Examples of components (a2) are methyl, ethyl, propyl, n-butyl, isobutyl, tert-butyl, pentyl, hexyl, heptyl and 2-ethylhexyl acrylate and methacrylate, and also cyclohexyl acrylate and cyclohexyl methacrylate. Examples of components (b2) are hydroxyethyl, hydroxypropyl and hydroxybutyl acrylate or methacrylate. Examples of components (d2) are vinylaromatic compounds, such as styrene, vinyltoluene, alpha-methylstyrene, alpha-ethylstyrene, ring-substituted diethylstyrenes, isopropylstyrene, butylstyrenes and methoxystyrenes; vinyl ethers, such as ethyl vinyl ether, n-propyl vinyl ether, isopropyl vinyl ether, n-butyl vinyl ether and isobutyl vinyl ether, and vinyl esters, such as vinyl acetate, vinyl propionate, vinyl butyrate, vinyl pivalate and the vinyl ester of 2-methyl-2-ethylheptanoic acid. The hydroxyl number and the acid number of the polyacrylate resins can easily be controlled by the person skilled in the art by way of the amount of component (b2) and/or (c2) employed.

Further suitable polyacrylate components are the hydroxy-functional compounds mentioned in European Patent Application EP 0 767 185 and in the U.S. Pat. Nos. 5,480,943, 5,475,073 and 5,534,598.

As the hydroxy-functional binder component, use is also made, for example, of polyacrylate resins obtainable by subjecting (A1) from 10 to 51% by weight, preferably from 25 to 41% by weight, of 4-hydroxy-n-butyl acrylate or 4-hydroxy-n-butyl methacrylate, or a mixture of 4-hydroxy-n-butyl acrylate and 4-hydroxy-n-butyl methacrylate, preferably 4-hydroxy-n-butyl acrylate, (A2) from 0 to 36% by weight, preferably from 0.1 to 20% by weight, of a hydroxyl-containing ester of acrylic acid or of a hydroxyl-containing ester of methacrylic acid which is different from (A1), or a mixture of such monomers, (A3) from 28 to 85% by weight, preferably from 40 to 70% by weight, of an aliphatic or cycloaliphatic ester of methacrylic acid having at least 4 carbon atoms in the alcohol residue, this monomer being different from (A1) and (A2), or a mixture of such monomers, (A4) from 0 to 3% by weight, preferably from 0.1 to 2% by weight, of an ethylenically unsaturated carboxylic acid or of a mixture of ethylenically unsaturated carboxylic acids, and (A5) from 0 to 20% by weight, preferably from 5 to 15% by weight, of an unsaturated monomer which is different from (A1), (A2), (A34) and (A4), or a mixture of such monomers, to addition polymerization to give a polyacrylate resin having a hydroxyl number of from 60 to 200, preferably from 100 to 160, an acid number of from 0 to 35, preferably from 0 to 25, and a number-average molecular weight of from 1500 to 10,000, preferably from 2500 to 5000, the sum of the parts by weight of components (A1) to (A5) always being 100% and the composition of component (A3) being chosen such that addition polymerization of component (A3) alone gives a polymethacrylate resin having a glass transition temperature of from +10 to +100 degrees C., preferably from +20 to +60 degrees C. Examples of component (A2) are hydroxyalkyl esters of acrylic acid, such as hydroxyethyl acrylate and hydroxypropyl acrylate, and hydroxyalkyl esters of methacrylic acid, such as hydroxyethyl methacrylate and hydroxypropyl methacrylate, the choice being made such that addition polymerization of component (A2) alone gives a polyacrylate resin having a glass transition temperature of 0 to +80 degrees C., preferably from +20 to +60 degrees C. Examples of component (A3) are aliphatic esters of methacrylic acid having 4 to 20 carbon atoms in the alcohol residue, such as n-butyl, isobutyl, tert-butyl, 2-ethylhexyl, stearyl and lauryl methacrylate, and cycloaliphatic esters of methacrylic acid, such as cyclohexyl methacrylate. As component (A4) it is preferred to employ acrylic and/or methacrylic acid. Examples of component (A5) are vinylaromatic hydrocarbons, examples being styrene, α-alkylstyrene and vinyltoluene, amides of acrylic and methacrylic acid, examples being methacrylamide and acrylamide, nitrites of acrylic and methacrylic acid, vinyl ethers and vinyl esters. As component (A5) it is preferred to employ vinylaromatic hydrocarbons, especially styrene. The composition of component (A5) is preferably made such that addition polymerization of component (A5) alone gives a polymer having a glass transition temperature of from +70 to +120 degrees C., preferably from +80 to +100 degrees C. These polyacrylate resins can be prepared by well-known techniques of addition polymerization (see e.g. Houben-Weyl, Methoden der organischen Chemie, 4th edition, volume 14/1, pages 24 to 255 (1961)). They are preferably prepared by means of solution polymerization. In this case, customarily, an organic solvent or solvent mixture is introduced as the initial charge and is heated to boiling. The monomer mixture to be polymerized, and also one or more polymerization initiators, are then added continuously to this organic solvent or solvent mixture. The addition polymerization takes place at temperatures between 100 and 200° C., preferably between 130 and 180° C. Polymerization initiators employed are preferably initiators which form free radicals. The nature and amount of the initiators are commonly chosen such that the supply of free radicals available during the feed phase at the polymerization temperature is as constant as possible.

Examples of initiators which can be employed are dialkyl peroxides, such as di-tert-butyl peroxide and dicumyl peroxide, hydroperoxides, such as cumene hydroperoxide and tert-butyl hydroperoxide, peresters, such as tert-butyl perbenzoate, tert-butyl perpivalate, tert-butyl per-3,5,5-trimethylhexanoate and tert-butyl per-2-ethylhexanoate, or bisazo compounds, such as azobisisobutyronitrile. The polymerization conditions (reaction temperature, feed time of the monomer mixture, nature and amount of the organic solvents and polymerization initiators, possible use of molecular weight regulators, e.g., mercaptans, thioglycolic esters and chlorinated hydrocarbons) are selected such that the polyacrylate resins have a number-average molecular weight like that indicated (determined by gel permeation chromatography using polystyrene as calibration substance). The acid number can be adjusted by the person skilled in the art using appropriate amounts of component (A4). Similar comments apply to the adjustment of the hydroxyl number, which can be controlled by way of the amount of component (A1) and (A2) employed.

The preparation of these addition polymers is described, for example, in the international patent application WO 97/17431.

It is additionally possible to use products available on the market which are sold under the brand name Joncryl®, an example being Joncryl® SCX 922.

It is possible to employ suitable polyester resins and alkyd resins, and they can be prepared by reacting (a1) a cycloaliphatic or aliphatic polycarboxylic acid or a mixture of such polycarboxylic acids, (b1) an aliphatic or cycloaliphatic polyol having more than two hydroxyl groups in the molecule, or a mixture of such polyols, (c1) an aliphatic or cycloaliphatic diol or a mixture of such diols, and (d1) an aliphatic linear or branched saturated monocarboxylic acid or a mixture of such monocarboxylic acids, in a molar ratio of (a1):(b1):(c1):(d1) = 1.0:0.2–1.3:0.0–1.1:0.0–1.4, preferably 1.0:0.5–1.2:0.0–0.6:0.2–0.9, to give a polyester resin or alkyd resin. Examples of constituent (a1) are hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid and sebacic acid. Examples of constituent (b1) are pentaerythritol, trimethylolpropane, trimethylolethane and glycerol. Examples of constituent (c1) are ethylene glycol, diethylene glycol, propylene glycol, neopentyl glycol, 2-methyl-2-propyl-1,3-propanediol, 2-ethyl-2-butyl-1,3-propanediol, 2,2,4-trimethyl-1,5-pentanediol, 2,2,5-trimethyl-1,6-hexanediol, neopentyl glycol hydroxypivalate, and dimethylolcyclohexane. Examples of constituent (d1) are 2-ethylhexanoic acid, lauric acid, isooctanic acid, isononanic acid, and monocarboxylic acid mixtures obtained from coconut oil or palm kernel oil.

The preparation of hydroxyl-bearing polyester resins and/or alkyd resins is described, for example, in Ullmanns Encyklopädie der technischen Chemie, third edition, Vol. 14, Urban & Schwarzenberg, Munich, Berlin 1963, pages 80 to 89 and pages 99 to 105, and in the following books: Résines Alkydes-Polyesters by J. Bourry, Paris, Dunod 1952, Alkyd Resins by C. R. Martens, Reinhold Publishing Corporation, New York 1961, and Alkyd Resin Technology by T. C. Patton, Interscience Publishers 1962.

Also suitable, furthermore, are polyurethane-based binders. Urethane (meth)acrylates are well known to the person skilled in the art and therefore need not be elucidated further. Examples of suitable polyurethane resins are the resins described in the following German, European and international patents: DE 44 01 544, DE 195 34 316, EP 0 708 788 and WO 97/14731.

By the partial replacement of the binders or binder mixtures described with the polyols I to be used in accordance with the invention, it is possible surprisingly to achieve relatively high solids contents without the occurrence of substantial disadvantages as far as the profiles of properties of the coatings are concerned. For instance, it has been possible, with markedly higher solids contents of the coating compositions of the invention, to achieve scratch-resistance and film-hardness values that are just as good, with comparable acid resistance of the coatings, which in accordance with the prior art to date was possible only by observing lower solids contents. In accordance with the invention, therefore, it is possible in particular to achieve a higher reflow potential and, owing to the higher solids content, a reduction in solvent emission.

In addition to the binders described, the coating compositions of the invention also comprise other constituents which are customary according to the prior art. In this context it is possible to design the coating compositions of the invention as one-component or else multicomponent systems. Such systems differ essentially in the nature of the crosslinking agent that is employed. In both cases, suitable crosslinking agents are all those which react with hydroxyl groups under the curing conditions. Examples of suitable crosslinking agents are amino resins, siloxane-functional compounds or resins, anhydride-functional compounds or resins, blocked and nonblocked polyisocyanates and/or alkoxycarbonylaminotriazines, but especially blocked polyisocyanates and/or tris(alkoxycarbonylamino)triazines.

Both in one-component and in two-component or multi-component systems it is possible in accordance with the invention to employ blocked isocyanates or a mixture of blocked polyisocyanates.

The blocked isocyanates which can be employed are preferably of such a configuration that they comprise both isocyanates blocked with a blocking agent (Z1) and isocyanate groups blocked with a blocking agent (Z2), the blocking agent (Z1) being a dialkylmalonate or a mixture of dialkyl malonates, the blocking agent (Z2) being different from (Z1) and being a blocking agent comprising active methylene groups, an oxime, or a mixture of these blocking agents, and the ratio of equivalents between the isocyanate groups blocked with (Z1) and the isocyanate groups blocked with (Z2) being between 1.0:1.0 and 9.0:1.0, preferably between 8.0:2.0 and 6.0:4.0 and with particular preference, between 7.5:2.5 and 6.5:3.5.

However, it is also possible to use dimethylpyrazole and/or substituted triazoles as blocking agents.

The blocked isocyanate is preferably prepared as follows:

A polyisocyanate or a mixture of polyisocyanates is reacted conventionally with a mixture of the blocking agents (Z1) and (Z2), the mixture of the blocking agents (Z1) and (Z2) comprising the blocking agents (Z1) and (Z2) in a molar ratio which lies between 1.0:1.0 and 9.0:1.0, preferably between 8.0:2.0 and 6.0:4.0 and, with particular preference, between 7.5:2.5 and 6.5:3.5.

The polyisocyanate or the mixture of polyisocyanates can be reacted with the mixture of the blocking agents (Z1) and (Z2) to such an extent that isocyanate groups can no longer be detected. In practice, this may require the use of very large excesses of blocking agents and/or very long reaction times.

It has been found that, even then, coating materials having good properties are obtained when at least 50, preferably at least 70, percent of the isocyanate groups of the polyisocyanate or of the mixture of polyisocyanates are reacted with the mixture of the blocking agents (Z1) and (Z2) and the remaining isocyanate groups are reacted with a hydroxyl-containing compound or with a mixture of hydroxyl-containing compounds. Hydroxyl-containing compounds employed are preferably low molecular mass aliphatic or cycloaliphatic polyols, such as neopentyl glycol, dimethylolcyclohexane, ethylene glycol, diethylene glycol, propylene glycol, 2-methyl-2-propyl-1,3-propanediol, 2-ethyl-2-butyl-1,3-propanediol, 2,2,4-trimethyl-1,5-pentanediol and 2,2,5-trimethyl-1,6-hexanediol, or the hydroxyl-containing binder which can be employed as constituent (1).

A suitable blocked polyisocyanate is also obtainable by mixing blocked polyisocyanates with the blocking agent (Z1) and/or (Z2) in a proportion such as to give a mixture in which the ratio of equivalents between the isocyanate groups blocked with (Z1) and the isocyanate groups blocked with (Z2) lies between 1.0:1.0 and 9.0:1.0, preferably between 8.0:2.0 and 6.0:4.0, and with particular preference, between 7.5:2.5 and 6.5:3.5.

In principle, all polyisocyanates that can be employed in the coatings field can be used to prepare the blocked polyisocyanate. It is preferred, however, to employ polyisocyanates whose isocyanate groups are attached to aliphatic or cycloaliphatic radicals. Examples of such polyisocyanates are hexamethylene diisocyanate, isophorone diisocyanate, trimethylhexamethylene diisocyanate, dicyclohexylmethane diisocyanate and 1,3-bis(2-isocyanatopropyl-2-yl)benzene (TMXDI), and also adducts of these polyisocyanates with polyols, especially low molecular mass polyols, such as trimethylolpropane, and isocyanurate- and biuret-functional polyisocyanates derived from these polyisocyanates. Also suitable are 1,3- and/or 1,4-bis(isocyanatomethyl)cycloalkanes, such as 1,3- and/or 1,4-bis(isocyanatomethyl)cyclohexane.

As polyisocyanates it is particularly preferred to employ hexamethylene diisocyanate and isophorone diisocyanate, isocyanurate- or biuret-functional polyisocyanates that are derived from said diisocyanates and include preferably more than two isocyanate groups in the molecule, and also reaction products of hexamethylene diisocyanate and isophorone diisocyanate or of a mixture of hexamethylene diisocyanate and isophorone diisocyanate with 0.3–0.5 equivalents of a low molecular mass polyol having a molecular weight from 62 to 500, preferably from 104 to 204, in particular a triol, such as trimethylolpropane, for example.

Blocking agents (Z1) employed are dialkyl malonates or a mixture of dialkyl malonates. Examples of dialkyl malonates that can be employed are those having 1 to 6 carbon atoms in each of the alkyl radicals, examples being dimethyl malonate and diethyl malonate, the latter being employed with preference. Blocking agents (Z2) employed are different from (Z1) and are blocking agents containing active methylene groups, and oximes, and also mixtures of these blocking agents. Examples of blocking agents which can be employed as blocking agents (Z2) are methyl, ethyl, propyl, butyl, pentyl, hexyl, heptyl, octyl, nonyl, decyl or dodecyl acetoacetate, acetone oxime, methyl ethyl ketoxime, acetylacetone, formaldoxime, acetaldoxime, benzophenoxime, acetoxime and diisobutyl ketoxime. As blocking agent (Z2) it is preferred to employ an alkyl acetoacetate having 1 to 6 carbon atoms in the alkyl radical, or a mixture of such alkyl acetoacetates, or a ketoxime or a mixture of ketoximes. Particular preference is given to the use of ethyl acetoacetate or methyl ethyl ketoxime as the blocking agent (Z2).

As crosslinking agents, it is also possible to employ tris(alkoxycarbonylamino)triazines of the formula

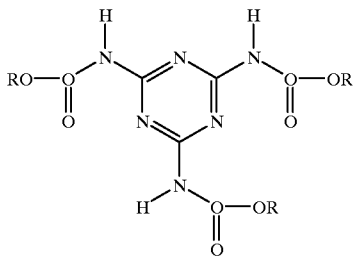

where R is methyl and/or other alkyl groups, especially butyl groups. It is also possible to employ derivatives of said compounds. For the constituent (2) it is preferred to employ tris(alkoxycarbonylamino)triazines as are described in U.S. Pat. No. 5,084,541.

The coating compositions of the invention can also be multicomponent systems, preferably two-component systems. In this case the coating composition has a second component which as a crosslinking agent comprises at least one nonblocked di- and/or polyisocyanate which may or may not be dissolved in one or more organic solvents. In addition, however, blocked polyisocyanate or a mixture of blocked isocyanates can also be present in the second component.

The free polyisocyanate constituent which can be employed comprises any desired organic polyisocyanates having free isocyanate groups attached to aliphatic, cycloaliphatic, araliphatic and/or aromatic moieties. Preference is given to the use of polyisocyanates having 2 to 5 isocyanate groups per molecule and viscosities of from 100 to 2000 mPas at 23 degrees C.). If desired, small amounts of organic solvent, preferably from 1 to 25% by weight are based on pure polyisocyanate, may be added to the polyisocyanates in order to improve the ease of incorporation of the polyisocyanate and, if desired, to reduce its viscosity to a level within the abovementioned ranges.

Solvents suitable as additives for the polyisocyanates are, for example, ethoxyethyl propionate, butyl acetate and the like. Examples of suitable isocyanates are described, for example, in "Methoden der organischen Chemie", Houben-Weyl, Volume 14/2, 4th edition, Georg Thieme Verlag, Stuttgart 1963, pages 61 to 70, and by W. Siefken, Liebigs Ann. Chem. 562, 75 to 136.

Suitable, for example, are polyisocyanates and/or isocyanate-functional polyurethane prepolymers which can be prepared by reacting polyols with an excess of polyisocyanates and which are preferably of low viscosity. It is also possible to employ polyisocyanates which have isocyanurate groups and/or biuret groups and/or allophanate groups and/or urethane groups and/or urea groups and/or uretdione groups. Polyisocyanates which have urethane groups, for example, are obtained by reacting some of the isocyanate groups, with polyols, such as trimethylolpropane and glycerol, for example. It is preferred to employ aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate or dicyclohexylmethane 4,4'-diisocyanate, or mixtures of these polyisocyanates.

Very particular preference is given to the use of mixtures of uretdione- and/or isocyanurate- and/or allophanate-functional polyisocyanates based on hexamethylene diisocyanate, as are formed by catalytic oligomerization of hexamethylene diisocyanate using suitable catalysts. The polyisocyanate constituent may otherwise also consist of any desired mixtures of the free polyisocyanates mentioned by way of example.

In detail, the coating composition of the invention can additionally comprise UV absorbers and free-radical scavengers. It may also include catalysts for the crosslinking. Particularly suitable for this purpose are organometallic compounds, preferably organo tin and/or organobismuth compounds. Tertiary amine may also be suitable. Furthermore, the coating composition can comprise rheological agents and other coatings auxiliaries. It is of course also possible for pigments of any kind to be present, examples being color pigments such as azo pigments, phthalocyanine pigments, carbonyl pigments, dioxazine pigments, titanium dioxide, pigment-grade carbon black, iron oxides and chromium oxides or cobalt oxides, or special-effect pigments, such as metal flake pigments, especially aluminum flake pigments, and pearl luster pigments. Furthermore, the coating composition of the invention may if desired include further customary auxiliaries and/or additives, examples being slip additives, polymerization inhibitors, matting agents, defoamers, leveling agents and film-forming auxiliaries, such as cellulose derivatives, or other additives which are commonly employed in base coats. These customary auxiliaries and/or additives are commonly employed in an amount of up to 15% by weight, preferably from 2 to 9% by weight, based on the weight of the coating composition without pigments and without fillers.

The coating composition of the invention is prepared by the procedure of the invention, in which from 5 to 50% by weight, but in particular up to 40, preferably up to 30, with particular preference up to 20 and, in particular, up to 10% by weight of the solids of a coating composition is substituted by at least one polyol I to be used in accordance with the invention. For this purpose the customary methods are employed, such as the combining of the individual constituents and their mixing with stirring. The preparation of the coating composition consisting of two or more components takes place likewise by means of stirring or dispersion using the apparatuses that are commonly employed, for example, by means of dissolvers or the like, or by means of two-component metering and mixing units that are likewise customarily employed.

The coating composition of the invention is preferably formulated as a nonaqueous solution or dispersion (i.e., with organic solvents). For this purpose it is possible to use the organic solvents that are customary in the preparation of coating materials.

The binder mixture of the invention is preferably used to produce single-coat or multicoat systems and, with particular preference, to produce topcoats. Alternatively it can be used to produce a clearcoat that is to be applied over a base coat film—for example, a clearcoat of a multicoat system produced by the wet-on-wet technique. In addition, it may also be used as a primer or surfacer. The plastics with the other substrates can of course also be coated directly with the clearcoat or with the topcoat.

Finally, the coating compositions can also be applied to other substrates, such as metal, plastic, glass, wood or paper, for example. Application takes place with the aid of customary methods, for example, by spraying, knife coating, dipping or brushing.

The coating compositions can be employed for both the OEM finishing and the refinishing of car bodies. They are preferably employed, however, in the OEM finishing sector.

The coating compositions of the invention are preferably cured at temperatures from room temperature up to 180° C. Particularly preferred temperatures are those between 60 and 180° C. In specific forms of application of the coating compositions of the invention it is also possible to employ lower curing temperatures of from 60 to 160° C.

The invention is described in more detail below with reference to the examples:

EXAMPLE

TABLE 1

Composition of the novel (B, C) and of the conventional (A) 2-component system

| Constituents | A | B (parts by weight) | C |
|---|---|---|---|
| Component I | | | |
| Isocyanate hardener[a] | 33 | 33.5 | 33.6 |
| Component II | | | |
| OH acrylate[b] | 83.97 | 75 | 67.3 |
| Oligomeric polyol[i] | | 4.5 | 9.0 |
| TIN 384[c] | 1.2 | 1.2 | 1.2 |
| TIN 292[d] | 1.0 | 1.0 | 1.0 |
| DBTL[e] | 0.004 | 0.004 | 0.004 |
| Worlee[R]-ADD315[f] | 0.096 | 0.096 | 0.096 |
| ZN 73-1280[g] | 1.5 | 1.5 | 1.5 |
| Butylglycol acetate | 3.93 | 3.93 | 3.93 |
| Xylene | 0.2 | 4.67 | 4.67 |
| Solvent naphtha | | | 3.2 |
| GB ester[h] | 4.5 | 4.5 | 4.5 |
| Ethoxypropyl acetate | 2.0 | 2.0 | 2.0 |
| Butanol | 1.6 | 1.6 | 1.6 |
| Total | 100 | 100 | 100 |

[a]80% partial solution of Desmodur N3390 (polyisocyanate based on hexamethylene diisocyanate, from Bayer) in butyl acetate and solvent naphtha
[b]customary and known acrylate resin made from styrene, n-butyl methacrylate, t-butyl acrylate, hydroxypropyl methacrylate and acrylic acid as acrylate resin (B) (diluted to 53% solids content with a mixture of methoxypropyl acetate, butylglycol acetate and butyl acetate)
[i]oligomeric polyol I to be used in accordance with the invention (characteristics: OH number 350, viscosity 27.2 dPas at 23° [cone-and-plate viscometer], $M_n$ = 561, $M_w$ = 1068)
[c]commercial light stabilizer Tinuvin 384[R] from Ciba Specialty Chemical Inc.
[d]commercial light stabilizer Tinuvin 292[R] from Ciba Specialty Chemical Inc.
[e]dibutyl tin dilaurate
[f]commercial leveling additive from Worlee, D-Lauenburg
[g]5% strength solution of a polyether-substituted polydimethylsiloxane in xylene
[h]glycolic acid butyl ester from Wacker

| | Composition | | |
|---|---|---|---|
| | A | B (parts by weight) | C |
| Viscosity of component II (DIN 4 cup s at 23° C.): | | | |
| | 29s | 22s | 20.5s |
| Solids content of component I and II (1 h, 125° C.) of processing viscosity: | | | |
| | 53.6% | 58.7% | 60.5% |

Performance Tests

1. BART Test (Chemical Resistance)

The BART (BASF ACID RESISTANCE TEST) is used to determine the resistance of film surfaces to acids, alkalis and water drops. For the test, the coating, after stoving, is subjected to further temperature loads in a gradient oven (30 minutes at 40° C., 50° C., 60° C. and 70° C.). Beforehand, the test substances (1%, 10% and 36% strength sulfuric acid; 6% strength sulfurous acid; 10% strength hydrochloric acid; 5% strength sodium hydroxide solution; deionized water—1,2,3 and 4 drops—are applied in a defined manner with a metering pipette. After the substances had been allowed to act, they are removed under running water and the damage is assessed visually after 24 h in accordance with a predetermined scale:

| Rating | Appearance |
|---|---|
| 0 | no defect |
| 1 | slight marking |
| 2 | marking/matting/softening |
| 3 | marking/matting/color change/softening |
| 4 | cracks/incipient through-etching |
| 5 | clearcoat removed |

Each individual mark (spot) is evaluated and the result for each coating is noted in an appropriate form (for example, total marks for one temperature) The results are given in Table 1.

TABLE 1

Results of performance testing by the BART test

| Temperature (° C.) | Composition A | | | | Composition B | | | | Composition C | | | |
|---|---|---|---|---|---|---|---|---|---|---|---|---|
| | 40 | 50 | 60 | 70 | 40 | 50 | 60 | 70 | 40 | 50 | 60 | 70 |
| $H_2SO_4$ 1% | 0 | 0 | 0 | 4.5 | 0 | 0 | 0 | 4.5 | 0 | 0 | 0 | 4.5 |
| $H_2SO_4$ 10% | 0 | 0 | 0 | 4.5 | 0 | 0 | 0 | 4.5 | 0 | 0 | 0 | 4.5 |
| $H_2SO_4$ 36% | 0 | 0 | 0 | 4.5 | 0 | 0 | 0 | 4.5 | 0 | 0 | 0 | 4.5 |
| HCl 10% | 0 | 0 | 0 | 2 | 0 | 0 | 0 | 2 | 0 | 0 | 0 | 2 |
| $H_2SO_3$ 5% | 0 | 0 | 0 | 4 | 0 | 0 | 0 | 4.5 | 0 | 0 | 0 | 4.5 |
| NaOH 5% | 0 | 0 | 0 | 1 | 0 | 0 | 0 | 1 | 0 | 0 | 0 | 1.5 |
| deion. $H_2O$ 1 | 0 | 0 | 1.5 | 1 | 0 | 0 | 0 | 2 | 0 | 0 | 0.5 | 2 |
| deion. | 0 | 0 | 0 | 2 | 0 | 0 | 0.5 | 2 | 0 | 0 | 0 | 2 |

TABLE 1-continued

Results of performance testing by the BART test

| Temperature (° C.) | Composition A | | | | Composition B | | | | Composition C | | | |
|---|---|---|---|---|---|---|---|---|---|---|---|---|
| | 40 | 50 | 60 | 70 | 40 | 50 | 60 | 70 | 40 | 50 | 60 | 70 |
| $H_2O$ 2 deion. | 0 | 0 | 0 | 2 | 0 | 0 | 0.5 | 2 | 0 | 0 | 1 | 2 |
| $H_2O$ 3 deion. | 0 | 0 | 0 | 1 | 0 | 0 | 1 | 1.5 | 0 | 0 | 1 | 1 |
| $H_2O$ 4 | | | | | | | | | | | | |
| Total acid | 0 | 0 | 0 | 20.5 | 0 | 0 | 0 | 21 | 0 | 0 | 0 | 21.5 |
| Total water | 0 | 0 | 1.5 | 6 | 0 | 0 | 2 | 7.5 | 0 | 0 | 2.5 | 7 |

2. Sand Test (Scratch Resistance)

In the sand test, the film surface is subjected to sand (20 g of quartz silver sand 1.5–2.0 mm). The sand is placed in a PE beaker (base cut off flat) which is fastened firmly to the test panel. Using a motor drive, the panel with the beaker and the sand is set in oscillation. The movement of the loose sand damages the film surface (100 double strokes in 22 s). After the sand exposure, the test surface is cleaned to remove the abraded material, carefully wiped off under a jet of cold water, and then dried with compressed air. A measurement is made of the gloss in accordance with DIN 67530 before and after damage, at 20° C.

This test procedure tests the resistance (scratch resistance) of film surfaces (clearcoats and topcoats) to scratching from wash brushes. The procedure is a good imitation of the stress undergone by a film surface in a wash unit.

The results of the test are given in Table 2.

TABLE 2

Results of the sand test

| Gloss values[a] | Composition A | Composition B | Composition C |
|---|---|---|---|
| Initial gloss | 84 | 84 | 84 |
| Residual gloss | 53.5 | 55.5 | 56.5 |
| Gloss after 2 h, 40° C. | 55.3 | 58.1 | 60.2 |
| Floss after 2 h, 60° C. | 57.1 | 64.3 | 72.1 |

[a]measured at 20° C.

The results of the BART test on the one hand and of the sand test on the other emphasize the fact that the novel two-component systems (B and C) match the conventional two-component system (A) in the high acid resistance and exceed it markedly in the scratch resistance, especially in the reflow behavior at elevated temperatures, and in the solids content.

We claim:

1. A coating composition comprising at least one polyol, wherein the polyol is prepared by subjecting an oligomer to hydroformylation to give an aldehyde-functional product and reducing the aldehyde-functional product to give the polyol, wherein the oligomer is represented by the formula $$R_1 - \underset{R_2}{\overset{H}{\underset{|}{C}}} - \left[ \underset{}{\overset{H}{\underset{|}{C}}} - R - \underset{}{\overset{H}{\underset{|}{C}}} \right]_n - \underset{R_4}{\overset{}{\underset{|}{C}}} - R_3$$

wherein

R is selected from the group consisting of $(CH_2)_m$,

[cyclic structure with X]

and mixtures thereof, n is an integer from 1 to 15, m is an integer from 1 to 6, X is methylene or an oxygen atom, and $R^1$, $R^2$, $R^3$, and $R^4$ are each independently hydrogen or alkyl.

2. A coating composition according to claim 1, wherein m is 3.

3. A coating composition according to claim 1, wherein the polyol has a hydroxyl number of from about 200 to about 650.

4. A coating composition according to claim 1, wherein the polyol has a hydroxyl number of from about 250 to about 450.

5. A coating composition according to claim 1, comprising from 5 to 50% by weight of the polyol based on the total solids content of the composition.

6. A coating composition according to claim 1, further comprising a binder other than the polyol.

7. A coating composition according to claim 6, wherein the binder other than the polyol is hydroxyl-functional.

8. A coating composition according to claim 6, wherein the binder other than the polyol is selected from the group consisting of polyacrylates, polyesters, polyurethanes, acrylicized polyurethanes, acrylicized polyesters, polylactones, polycarbonates, polyethers, acrylate diols, methacrylate diols, and mixtures thereof.

9. A coating composition according to claim 1, wherein the composition is curable at temperatures up to 180° C.

10. A process for coating a substrate comprising applying to the substrate a coating composition according to claim 1.

11. A process according to claim 10, wherein the substrate is selected from the group consisting of metal, plastic, glass, wood, paper, and combinations thereof.

12. A coating composition according to claim 1, wherein the polyol is subjected to partial or complete hydrogenation.

13. A process for preparing a coating composition, comprising the step of including in the composition at least one polyol at a level of from 5 to 40 weight percent based on the total weight of the solids of the coating composition, wherein the polyol is prepared by subjecting an oligomer to hydroformylation to give an aldehyde-functional product and reducing the aldehyde-functional product to give the polyol, wherein the oligomer is represented by the formula

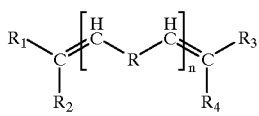

wherein
R is selected from the group consisting of $(CH_2)_m$,

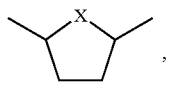

and mixtures thereof,
n is an integer from 1 to 15,
m is an integer from 1 to 6,
X is methylene or oxygen, and
$R^1, R^2, R^3$, and $R^4$ are each independently hydrogen or alkyl.

14. A process according to claim 13, wherein the coating composition comprises from about 5 to about 20 weight percent of the polyol based on the total weight of the solids of the coating composition.

15. A process according to claim 13, further comprising the step of including a binder other than the polyol in the composition.

16. A process according to claim 15, wherein the binder is hydroxyl-functional.

17. A process according to claim 15, wherein the binder is selected from the group consisting of polyacrylates, polyesters, polyurethanes, acrylicized polyurethanes, acrylicized polyesters, polylactones, polycarbonates, polyethers, acrylates diols, methacrylate diols, and mixtures thereof.

18. A process according to claim 13, wherein the polyol is subjected to partial or complete hydrogenation.

* * * * *